United States Patent
Furuhata et al.

(10) Patent No.: US 9,129,206 B2
(45) Date of Patent: Sep. 8, 2015

(54) PRINTING DEVICE AND PRINTING SYSTEM

(71) Applicant: Seiko Epson Corporation, Tokyo (JP)

(72) Inventors: Tadashi Furuhata, Nagano-ken (JP);
Shoji Shima, Nagano-ken (JP);
Katsutoshi Terashima, Nagano-ken (JP); Yoshihiro Ueno, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/946,222

(22) Filed: Jul. 19, 2013

(65) Prior Publication Data

US 2014/0022581 A1  Jan. 23, 2014

(30) Foreign Application Priority Data

Jul. 20, 2012 (JP) ................................. 2012-162087
Jul. 20, 2012 (JP) ................................. 2012-162088

(51) Int. Cl.
*G06F 3/12* (2006.01)
*G06K 15/02* (2006.01)

(52) U.S. Cl.
CPC .......... *G06K 15/1835* (2013.01); *G06F 3/1206* (2013.01); *G06F 3/1247* (2013.01); *G06F 3/1285* (2013.01); *G06F 3/1291* (2013.01)

(58) Field of Classification Search
None
See application file for complete search history.

(56) References Cited

U.S. PATENT DOCUMENTS

| | | | | |
|---|---|---|---|---|
| 5,974,228 | A  * | 10/1999 | Heitsch | 358/1.9 |
| 7,495,789 | B2 * | 2/2009  | Sato | 358/1.15 |
| 7,619,790 | B2 * | 11/2009 | Kambegawa et al. | 358/500 |
| 7,970,650 | B2   | 6/2011  | Tokorotani | |
| 8,290,312 | B2 * | 10/2012 | Ohguro | 382/309 |
| 8,294,928 | B2 * | 10/2012 | Okabe | 358/1.15 |
| 2006/0279801 | A1 * | 12/2006 | Nagai | 358/453 |
| 2007/0195353 | A1 * | 8/2007 | Tsunoda | 358/1.13 |
| 2009/0066996 | A1 | 3/2009 | Minowa | |
| 2009/0188972 | A1 | 7/2009 | Koakutsu | |
| 2009/0296124 | A1 * | 12/2009 | Ohguro | 358/1.9 |
| 2010/0201996 | A1 * | 8/2010 | Chang et al. | 358/1.2 |
| 2011/0315755 | A1 | 12/2011 | Koakutsu | |
| 2012/0127501 | A1 * | 5/2012 | Kobayashi | 358/1.13 |
| 2012/0243046 | A1 | 9/2012 | Koakutsu | |
| 2013/0146652 | A1 | 6/2013 | Koakutsu | |

FOREIGN PATENT DOCUMENTS

| | | |
|---|---|---|
| CN | 101493976 A | 7/2009 |
| EP | 2 083 404 A2 | 7/2009 |
| JP | 2004-086477 A | 3/2004 |
| JP | 2009-187078 A | 8/2009 |
| JP | 2009-258836 A | 11/2009 |
| JP | 2012-123597 A | 6/2012 |

* cited by examiner

*Primary Examiner* — Marcus T Riley (57) ABSTRACT

A printer can be connected to a computer or other host device without being limited by the type of data processed by the printer. A POS system 1 has a POS terminal 10 connected to a first printer 60 that has a print unit 71. The print data acquisition unit 66 of the first printer 60 acquires data output by the POS terminal 10. A conversion unit 67 applies at least one of a process of converting graphic data to text data, and a process of converting text data to graphic data, to the data acquired by the data acquisition unit 66, and the conversion unit 67 outputs the resulting converted data.

9 Claims, 7 Drawing Sheets

PRINTING DEVICE AND PRINTING SYSTEM

CROSS-REFERENCE TO RELATED APPLICATIONS

This application claims priority under 35 U.S.C. §119 on Japanese Application nos. 2012-162087, and 2012-162088, both filed Jul. 20, 2012, which are hereby incorporated by reference in their entirety.

BACKGROUND

1. Technical Field

The present disclosure relates to a printing device and a printing system.

2. Related Art

Systems that print receipts using a printer connected to a computer are known from the literature. See, for example, Japanese Unexamined Patent Appl. Pub. JP-A-2009-187078, and JP-A-2012-123597. The system disclosed in JP-A-2012-123597 has a printer that prints receipts and a printer that prints coupons, and prints receipts and coupons using plural printers.

Some printers acquire and process text data as the data to be printed from a computer or other external device, some printers acquire and process graphic data (image data) as the data to be printed, and the printing system is generally configured using a printer with specifications matching the application. However, when a printer is added or replaced in order to provide expanded functionality in a system using such printers, the type of data used by the printer must be considered, and the number of printers and their application are limited.

SUMMARY

The present disclosure is directed to solving the foregoing problem. An object of the disclosure is to overcome limitations caused by the type of data processed by the printer when a printer is connected to a computer or other host device.

A printing system according to one aspect of the disclosure includes a host device and a printing device having a print unit. The printing device includes: a data acquisition unit that acquires data output by the host device; a conversion unit that applies to data acquired by the data acquisition unit at least one of a process that converts graphic data to text data and a process that converts text data to graphic data; and an output unit that outputs the converted data produced by the conversion unit.

Because the printing device converts the data output by the host, the printing device can be selected and connected without being limited by the type of data output by the host.

In a printing system according to another aspect of the disclosure, the host device outputs print data containing text data; and the data acquisition unit of the printing device acquires the print data output by the host device, and the conversion unit executes a process of converting the text data contained in the print data acquired by the data acquisition unit to graphic data.

In this aspect of the disclosure the printing device converts text data output by the host to graphic data. A printing system can therefore be built by connecting a printing device suited to printing graphic data to a host device that outputs text data.

In a printing system according to another aspect of the disclosure, the print unit of the printing device prints based on the data output by the output unit.

In this aspect of the disclosure, the printing device connected to the host converts the text data output by the host to graphic data and then prints. As a result, a printer can be connected and print data output by the host regardless of the type of data output by the host.

In a printing system according to another aspect of the disclosure, a second printing device is connected to the printing device; the output unit of the printing device outputs the converted data to the second printing device; and the second printing device prints the converted data output by the output unit.

This aspect of the disclosure can convert and output the data output by the host to the second printing device for printing by the second printing device. As a result, two printers can be connected to the printing system without being limited by the type of data output by the host.

In a printing system according to another aspect of the disclosure, the host device outputs the print data for printing by the second printing device; and the data acquisition unit of the printing device acquires the print data output from the host device.

In this aspect of the disclosure the host outputs print data for printing by the second printing device, and the printing device acquires and converts this print data. The print data output by the host can therefore be printed by the second printing device, and the other printing device can also process the print data output by the host. For example, when the printing device and the second printing device are suited to printing different types of data, and the host outputs print data suited to the second printing device, both the printing device and the second printing device can process the print data. The printing device can also be added to a system comprising the host and second printing device to render the printing system of the disclosure. In this implementation, the second printing device is any printing device suited to the type of data output by the host, and operation of the added printing device will not be limited by the type of data output by the host. As a result, a printing device can be easily added to a system that already has a printing device.

In a printing system according to another aspect of the disclosure, the host device is a POS terminal that outputs print data containing text data for transaction information; and the printing device prints a receipt based on print data containing text data for transaction information output by the output unit.

The printing device in this aspect of the disclosure converts text data output by the POS terminal to graphic data. As a result, a printer suited to graphic data can produce a printout, such as a receipt, containing transaction information.

In a printing system according to another aspect of the disclosure, the host device outputs print data containing graphic data; and the data acquisition unit of the printing device acquires the print data output by the host device, and the conversion unit executes a process of converting the graphic data contained in the print data acquired by the data acquisition unit to text data.

The printing device in this aspect of the disclosure acquires and converts graphic data output by the host device to text data. A printing system can therefore be built by connecting a printing device suited to printing text data to a host device that outputs graphic data.

In a printing system according to another aspect of the disclosure, the print unit of the printing device prints based on the data output by the output unit.

The printing device connected to the host converts text data output by the host to graphic data and prints in this aspect of the disclosure. As a result, a printing device can be connected and print data output by the host device.

In a printing system according to another aspect of the disclosure, a second printing device is connected to the printing device; the output unit of the printing device outputs the converted data to the second printing device; and the second printing device prints the converted data output by the output unit.

This aspect of the disclosure enables converting data output by the host and outputting the converted data to the second printing device for printing. Two printing devices can therefore be connected to the printing system without being limited by the type of data output by the host device.

In a printing system according to another aspect of the disclosure, the host device outputs the print data for printing by the second printing device; and the data acquisition unit of the printing device acquires the print data output from the host device for printing by the second printing device.

In this aspect of the disclosure the host outputs print data for printing by the second printing device, and the printing device acquires and converts this print data. The print data output by the host can therefore be printed by the second printing device, and the other printing device can also process the print data output by the host. For example, when the printing device and the second printing device are suited to printing different types of data, and the host outputs print data suited to the second printing device, both the printing device and the second printing device can process the print data. The printing device can also be added to a system comprising the host and second printing device to render the printing system of the disclosure. In this implementation, the second printing device is any printing device suited to the type of data output by the host, and operation of the added printing device will not be limited by the type of data output by the host. As a result, a printing device can be easily added to a system that already has a printing device.

In a printing system according to another aspect of the disclosure, the host device is a POS terminal that outputs print data containing graphic data and text data for transaction information; and the data acquisition unit of the printing device acquires the print data output from the host device, the conversion unit converts graphic data contained in the print data acquired by the data acquisition unit to text data, and the print unit prints a receipt based on the converted data output by the output unit.

The printing device in this aspect of the disclosure can print a receipt based on data output by a POS terminal. Because the printing device converts graphic data to text data, graphic data can be printed in the same way as text data when graphic data is included in the data output by the POS terminal. As a result, the printing device can print a receipt regardless of whether the host device outputs graphic data or text data.

In a printing system according to another aspect of the disclosure, the data acquisition unit of the printing device acquires graphic data from an external source based on data output by the host device, the conversion unit executes a process of converting the graphic data acquired by the data acquisition unit from an external source to text data, and the print unit prints based on the converted text data output by the output unit.

In this aspect of the disclosure the printing device acquires graphic data from an external source, converts the graphic data to text data, and prints. As a result, other data, including data related to data output by the host device, can be printed. The printing device can also print whether the externally acquired data is graphic data or text data. Data can thus be externally acquired and printed without being limited by the type of data.

In a printing system according to another aspect of the disclosure, the host device is a POS terminal that outputs print data containing text data for transaction information; and the data acquisition unit of the printing device acquires graphic data from an external source based on the text data for transaction information contained in the data output by the host device.

Based on text data for transaction information output by the POS terminal, the printing device in this aspect of the disclosure acquires graphic data from an external source, converts the graphic data to text data, and prints. As a result, the printing device can acquire and print other data related to the transaction information. A function for outputting other printouts can therefore be added without changing the function of the POS terminal. The printing device can also print whether the externally acquired data is graphic data or text data. Data can thus be externally acquired and printed without being limited by the type of data.

Another aspect of the disclosure is a printing device including a data acquisition unit that acquires data input from an external device; a conversion unit that applies at least one of a process of converting graphic data to text data and a process of converting text data to graphic data, to data acquired by the data acquisition unit; and an output unit that outputs the converted data generated by the conversion unit.

Because the printing device converts data input from an external device, the printing device can be connected to different devices without being limited by the type of data input to the printing device.

The data acquisition unit of the printing device acquires text data; and the conversion unit converts the text data acquired by the data acquisition unit to graphic data.

Because the printing device converts input text data to graphic data, the printing device can be connected to devices that output text data, and devices that output graphic data. This printing device can therefore be used to add a printer to, or replace an existing printer in, an existing system without being limited by the type of data processed.

The printing device also has a connection unit that connects to a host device that outputs text data; and the data acquisition unit acquires the text data output from the host device.

The printing device according to this aspect of the disclosure enables adding a printer to, or replacing an existing printer in, a system having a host device that outputs text data.

The conversion unit converts the text data acquired by the data acquisition unit to graphic data compatible with the size of the print medium used by the print unit.

This aspect of the disclosure acquires and converts text data to graphic data compatible with the size of the print medium to print, and can therefore print appropriately to the print medium.

The data acquisition unit acquires graphic data; and the conversion unit converts the graphic data acquired by the data acquisition unit to text data.

Because this aspect of the disclosure converts graphic data to text data, a printing device that can connect both to devices that output text data and devices that output graphic data can be provided.

The printing device according to this aspect of the disclosure enables adding a printer to, or replacing an existing printer in, different systems without being limited by the type of data processed.

The printing device also has a connection unit that connects to a host device that outputs graphic data, and the data acquisition unit acquires the graphic data output from the host device.

This printing device can therefore be used to add a printer to, or replace an existing printer in, a system having a host device that outputs graphic data.

The conversion unit converts the graphic data to text data compatible with the size of the print medium used by the print unit.

This aspect of the disclosure acquires and converts graphic data to text data compatible with the size of the print medium before printing, and can therefore print appropriately to the print medium.

Other objects and attainments together with a fuller understanding of the disclosure will become apparent and appreciated by referring to the following description and claims taken in conjunction with the accompanying drawings.

DESCRIPTION OF EMBODIMENTS

Embodiment 1

An embodiment is described below with reference to the accompanying figures.

Figure 1:
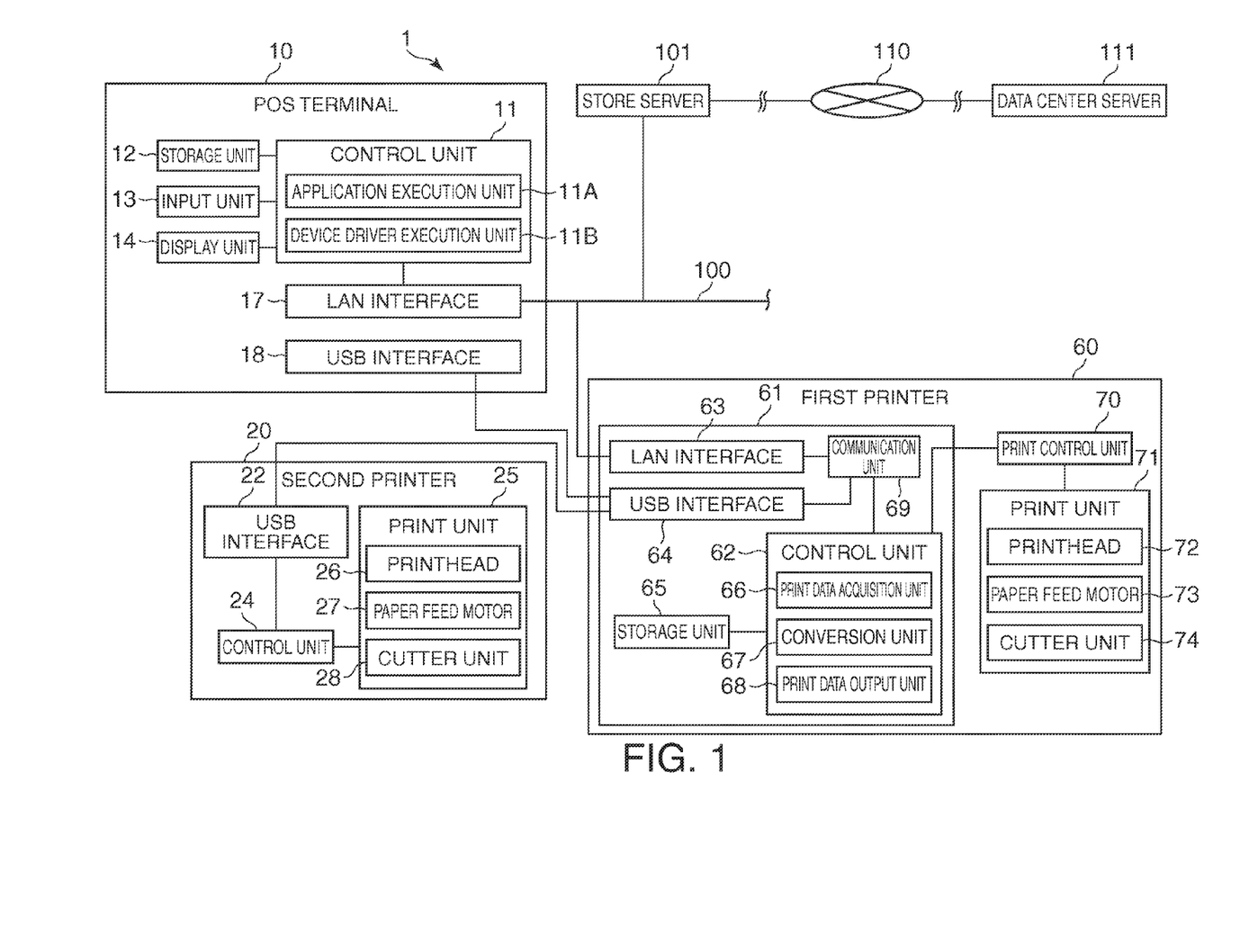
FIG. 1 is a functional block diagram of a POS system according to a first embodiment.

The POS (point of sale) system 1 (printing system) shown in FIG. 1 includes a first printer 60 (printing device) according to the disclosure, a POS terminal 10 that executes an application, generates documents, and outputs print instructions, and a second printer 20 (second printing device) that prints according to the print instructions output by the POS terminal 10. The first printer 60 is installed between the POS terminal 10 and second printer 20.

In this embodiment the POS terminal 10 and first printer 60 connect to each other through a USB cable, and the first printer 60 and second printer 20, which is a receipt printer, connect to each other through a USB cable.

The POS system 1 is used in a shopping center, department store, or other retail business, and is used to manage product marketing, product inventory, and product sales in the business.

The POS terminal 10 is a device that runs a transaction process related to a purchase transaction by a customer and outputs transaction result information at a particular checkout counter in the business. A POS terminal 10 may be installed at each of plural checkout counters. The POS terminal 10 includes a control unit 11 that controls other parts of the POS terminal 10, and a storage unit 12, input unit 13, and display unit 14 connected to the control unit 11. The POS terminal 10 has a LAN interface 17 or USB interface 18, or both, as interfaces for connecting external devices.

In this embodiment the POS terminal 10 and first printer 60 are each connected to an in-store LAN 100.

The control unit 11 includes a CPU and memory such as RAM or ROM, and controls other parts of the POS terminal 10 and executes the functions of a POS terminal 10 by running a program stored in the storage unit 12. The control unit 11 has an application execution unit 11A that runs a POS application program and executes a transaction process and receipt printing function, and a device driver execution unit 11B that runs a device driver program and controls a printer connected through the LAN interface 17 or USB interface 18.

The storage unit 12 stores the programs executed by the control unit 11 and data related to those programs.

The input unit 13 connects to an input device such as a keyboard for operating the POS terminal 10, and outputs data input from the input device to the control unit 11.

The display unit 14 has an LCD or other type of display screen, and displays data processed by the control unit 11 and the operating status of the POS terminal 10, for example. The display unit 14 could include a customer display that displays the purchased products and price information for the customer when the POS terminal 10 executes the transaction process.

The LAN interface 17 has an Ethernet (R) connector or IEEE 802.11 wireless communication circuit, connects to the in-store LAN 100, and sends and receives data with other devices over the in-store LAN 100.

The USB interface 18 includes a USB connector and interface circuit conforming to the USB standard, and handles data communication with the second printer 20 and first printer 60.

A barcode scanner, magnetic card reader, electronic cash drawer, or other devices can connect to the USB interface 18, but are not shown in the figure.

The POS terminal 10 may also have an RS-232C or other type of interface in addition to the LAN interface 17 and USB interface 18.

The application execution unit 11A executes a transaction process related to a product sale based on information input from the input unit 13 or a barcode scanner connected to the USB interface 18, for example. The transaction process includes registering the products purchased by a customer, calculating the total price, registering the amount received, and calculating the amount of change due. When information read from the product barcode, or a product code, is input in the transaction process, the application execution unit 11A queries the store server 101 based on the input information, and acquires the product name and product price from a product database (not shown in the figure) maintained on the store server 101.

The application execution unit 11A outputs data to be printed and a print instruction to print a receipt for the transaction after the transaction process is completed.

The application execution unit 11A sends the result of the transaction process and/or data compiling the results of transaction processes during a specific period of time through the in-store LAN 100 to the store server 101. The store server 101 acquires the data sent by the POS terminal 10, acquires and compiles data sent by each POS terminal 10 when a plurality of POS terminals 10 are connected to the store server 101, and stores the data in a storage device not shown. The store server 101 could also send the stored data to the data center server 111 via a network 110 at predetermined times.

The device driver program run by the device driver execution unit 11B is compatible with the device connected through the LAN interface 17, or the device connected through the USB interface 18. More specifically, the device driver execution unit 11B is compatible with the second printer 20, and runs a device driver program that causes the second printer 20 to print a receipt. The device driver execution unit 11B acquires the print instruction and data output by the application execution unit 11A, generates a print command and print data for printing the output data according to the received print instruction, and outputs the print command and print data to an external device. The interface to which the target device (the device to control) is connected is set in the device driver execution unit 11B. The device driver execution unit 11B outputs the print command and print data to the LAN interface 17 or USB interface 18, and more specifically to the interface to which the second printer 20 is connected.

In this embodiment the first printer 60 is connected to the USB interface 18, and the second printer 20 is connected through the first printer 60 as described below. The USB interface 18 sends the print command and print data output from the device driver execution unit 11B using the USB protocol. The print command and print data sent by the POS terminal 10 from the USB interface 18 is sent through the first printer 60 to the second printer 20.

The second printer 20 includes a USB interface 22 and a control unit 24 (second printer control unit) that receives commands through the USB interface 22. The control unit 24 receives print command and print data through the USB interface 22, and executes the received print command and controls the print unit 25 (second printer print unit) to print. The control unit 24 also sends status information describing the current operating status from the USB interface 22 when printing is successful, when an error occurs, and when a status report request is received from the USB interface 22.

The print unit 25 includes a print head 26 that forms characters and images on roll paper, cut-sheet paper, or other print medium as controlled by the control unit 24, a paper feed motor 27 that conveys the print medium as controlled by the control unit 24, and a cutter unit 28 that cuts the print medium as controlled by the control unit 24.

The second printer 20 could be a thermal printer or inkjet printer, for example.

If the second printer 20 is an inkjet printer, the second printer 20 has an inkjet print head 26 that ejects four colors of ink, CMYK, onto the printing surface of the print medium to form characters and images. The print head 26 could be a print head that uses two colors of ink, red and black, or a print head that uses the four CMYK colors plus additional colors of ink. In this configuration, the second printer 20 is suited to printing graphic data. If the print data received through the USB interface 22 is graphic data, including bitmap data or compressed image data, the control unit 24 writes the graphic data to buffer memory not shown in the second printer 20, controls the print unit 25, and prints by means of the print unit 25.

Because the device driver execution unit 11B generates the print data according to the specifications of the second printer 20 as described above, the device driver execution unit 11B generates graphic data for one page of a printout containing the characters or images in the data output by the application execution unit 11A, and outputs print data including this graphic data with a print command instructing printing to the USB interface 18.

When the second printer 20 is a thermal printer, the print head 26 is a thermal head that applies heat to the printing surface of the print medium.

In this configuration, the second printer 20 is suitable for printing text data. When data (text data) that specifies the characters to be printed using character codes is included in the print data received by the USB interface 22, the control unit 24 reads the font data corresponding to the character codes from a storage unit (second printer storage unit) not shown of the second printer 20, and controls the print unit 25 to print.

Because the device driver execution unit 11B generates the print data according to the specifications of the second printer 20 as described above, the device driver execution unit 11B generates print data containing the character codes of the characters to print when the data output by the application execution unit 11A contains character codes, and outputs the print data to the USB interface 18.

The first printer 60 includes a print unit 71 (first printer print unit) that prints on roll paper or cut-sheet paper, a print control unit 70 that controls the printing operation of the print unit 71, and a data processing unit 61.

The data processing unit 61 includes a control unit 62 (first printer control unit), a LAN interface 63, a USB interface 64, a storage unit 65 (first printer storage unit), and a communication unit 69 (first printer communication unit). The control unit 62 includes CPU, RAM, ROM, and other peripheral circuits and controls parts of the first printer 60 by running a program stored in the storage unit 65.

The LAN interface 63 has an Ethernet (R) connector or IEEE 802.11 wireless communication circuit, connects to the in-store LAN 100, and sends and receives data with other devices over the in-store LAN 100. The LAN interface 63 also has a plurality of RJ-45 connectors, and can exchange data with each of the other devices connected to the connectors. In this embodiment, for example, the LAN interface 63 exchanges data with the POS terminal 10 and store server 101 connected through the in-store LAN 100 as controlled by the communication unit 69.

The LAN interface 63 also functions as a network hub with a relay function, and can output data received through any connector to another connector.

The USB interface 64 includes a USB connector and interface circuit conforming to the USB standard, and handles data communication with the POS terminal 10. The USB interface 64 has a plurality of USB connectors that can connect a USB cable.

At least one of the plural USB connectors of the USB interface 64 is a type-B female connector (receptacle) with the shape and pins specified by the USB standard for a target device connector. The USB interface 64 has the functions of a USB device controller that operates as a target device as defined in the USB standard, reports the USB device class ID and device ID to the device connected through a USB cable to the type-B USB connector, and communicates according to the control data sent from the connected device. The POS terminal 10 is connected to the type-B USB connector in this embodiment.

At least one other connector of the USB interface 64 is a type-A female connector with the shape and pins specified by the USB standard for a host device connector. The USB interface 64 has the functions of a USB host controller that operates as a host device as defined by the USB standard. When a device classified as a target device by the USB standard is connected to the type-A USB connector, the USB interface 64 operates as a host to the connected device, and can recognize the device and communicate with the device. The second printer 20 is connected to the type-A USB connector in this embodiment. The number of type-A USB connectors in the USB interface 64 is not specifically limited.

Note that a target device as used herein is an input/output device that connects to a device operating as a host, outputs data to the host as controlled by the host, or outputs data input from the host.

A host as used herein is a computer or other control device that sends commands controlling the I/O devices to the I/O devices operating as target devices.

The USB interface 64 functions as a connection unit connected to the POS terminal 10 in this embodiment, but when the first printer 60 is connected to the POS terminal 10 through the in-store LAN 100, the LAN interface 63 functions as the connection unit.

The control unit 62 acquires a print command and print data through the LAN interface 63 or USB interface 64, whichever is used as the connection interface, and based on the acquired print data outputs data for printing to the print control unit 70.

The print control unit 70 controls the print unit 71 based on the print data output by the control unit 62, and the data processing unit 61 prints on the roll paper, cut-sheet paper, or other print medium.

The print unit 71 includes a print head 72 that forms characters and images on the print medium, a paper feed motor 73 that conveys the print medium, and a cutter unit 74 that cuts the print medium, and these units operate as controlled by the print control unit 70 (first printer print control unit).

The data processing unit 61 may be an inkjet printer or thermal printer, for example. When the first printer 60 is an inkjet printer, the first printer 60 has an inkjet print head 72 that ejects four colors of ink, CMYK, onto the printing surface of the print medium to form characters and images. The print head 72 could be a print head that uses two colors of ink, red and black, or a print head that uses the four CMYK colors plus additional colors of ink. When the first printer 60 is a thermal printer, the print head 72 is a thermal head that applies heat to the printing surface of the print medium.

When configured as an inkjet printer, the first printer 60 is suited to printing graphic data (image data). In this embodiment the control unit 62 generates image data by page unit specifying the position, size, and color of the characters and images printed on the print medium, and outputs this image data to the print control unit 70.

When the first printer 60 is a thermal printer, the first printer 60 is suited to printing text data. In this implementation, the control unit 62 outputs data containing the character codes of the characters to print on the print medium to the print control unit 70. The print control unit 70 then reads the font data corresponding to the character codes from a storage unit not shown of the print control unit 70, and controls the print unit 71 to print. To print image data such as a logo on the receipt, the first printer 60 passes the image data to the print control unit 70, and the print control unit 70 controls the print unit 71 to print the input image.

The control unit 62 includes a print data acquisition unit 66 (data acquisition unit) that acquires print data; a conversion unit 67 that converts print data acquired by the print data acquisition unit 66; and a print data output unit 68 (output unit) that outputs to the print control unit 70 the print data acquired by the print data acquisition unit 66 and/or the print data converted by the conversion unit 67.

The print data acquisition unit 66 acquires the print commands and print data sent by the POS terminal 10 to the second printer 20. When the POS terminal 10 is connected to the USB interface 64 as shown in FIG. 1, the print data acquisition unit 66 receives and acquires the print data input to the USB interface 64 through the communication unit 69.

When the LAN interface 63 is connected to the in-store LAN 100 or other network, the print data acquisition unit 66 receives by means of the communication unit 69 print data sent by the POS terminal 10 over the network to another printer. In this event, the communication unit 69 controls the LAN interface 63, and can also receive other data than data addressed to the network address assigned to the LAN interface 63. Based on the network address assigned to the received data, the communication unit 69 extracts the print data sent to the target printer from the received data.

The print data acquisition unit 66 temporarily stores the print command and print data sent from the POS terminal 10 to the storage unit 65, and passes the data to the second printer 20 from the USB interface 64.

The print data acquisition unit 66 has a function for acquiring new graphic data based on the print data received by the communication unit 69. More specifically, the print data acquisition unit 66 can acquire print data for a coupon based on the receipt print data sent by the POS terminal 10 to the second printer 20. For example, the print data acquisition unit 66 interprets the text data (character codes) contained in the print data received from the POS terminal 10, and detects a predetermined character or string from this text data. When the predetermined character or string is detected, the print data acquisition unit 66 controls the communication unit 69, accesses the store server 101 through the LAN interface 63, and acquires data for printing based on the detected character or string. The print data acquired by the print data acquisition unit 66 here is graphic data for a coupon.

The conversion unit 67 has at least one of a function for converting graphic data to text data, or a function for converting text data to graphic data, based on the data acquired by the print data acquisition unit 66. In some embodiments, the conversion unit 67 has both a function for converting graphic data to text data, and a function for converting text data to graphic data.

For example, if the first printer 60 is an inkjet printer and is suited to printing graphic data, and the print data acquired by the print data acquisition unit 66 is text data, the conversion unit 67 converts the text data to graphic data. More specifically, the conversion unit 67 generates graphic data for one page placing the characters in the print data at the specified positions, size, and color, and outputs to the print data output unit 68. For example, if the print data acquisition unit 66 acquires print data for a receipt containing text data such as the name and price of the purchased product, and the total purchase amount, the conversion unit 67 generates graphic data for one receipt with appropriately rendered text data.

If the first printer 60 is a thermal printer and is suited to printing text data, and the print data acquired by the print data acquisition unit 66 is graphic data, the conversion unit 67 converts the graphic data to text data. More specifically, the conversion unit 67 converts the graphic data to text data specifying the character codes in the text data, the character size, printing position, and print color, and outputs to the print data output unit 68. The conversion unit 67 may also generate print commands specifying line returns and the start printing position when converting the graphic data to text data. This enables the conversion unit 67 to generate text data for the characters in the coupon, or text data and print commands, when the print data acquisition unit 66 acquires print data composed of graphic data for a coupon.

The conversion unit 67 also has a function for converting the size of the print data acquired by the print data acquisition unit 66 according to the print medium used by the print unit 71. Based on the print data, or the print command and print data, acquired by the print data acquisition unit 66, the conversion unit 67 determines the size of print medium suited to printing the print data. The conversion unit 67 could determine the print size by detecting a command or parameter specifying the size of the print medium in the print command. Further alternatively, the conversion unit 67 could determine the print size based on the size of the graphic data when the print data is graphic data, and when the print data contains text data, generate a 1-page print image with the characters and images in the specified positions and sizes, and determine the print size based on the size of the print image. When the determined print size is not suitable for the size of the print medium to be used by the print unit 71, the conversion unit 67 converts the print data to match the size of the print medium. This size conversion process is applied to the print data acquired by the print data acquisition unit 66, either the print data sent by the POS terminal 10, or print data acquired by the print data acquisition unit 66 from the store server 101.

The conversion unit 67 outputs the data that does not require conversion in the print data acquired by the print data acquisition unit 66 to the print data output unit 68 without conversion. More specifically, when the first printer 60 is an inkjet printer, and the print data acquired by the print data acquisition unit 66 is graphic data, the conversion unit 67 passes the print data directly to the print data output unit 68 with no conversion. When the first printer 60 is a thermal printer and the print data acquired by the print data acquisition unit 66 is text data, the conversion unit 67 passes the print data directly to the print data output unit 68 with no conversion.

This also applies to the size of the print medium, and when the print data acquired by the print data acquisition unit 66 is compatible with the size of the print medium used by the print unit 71, the conversion unit 67 outputs directly to the print data output unit 68 without converting the size.

The print data output unit 68 outputs the print data input from the conversion unit 67 to the print control unit 70. The print data output by the print data output unit 68 may be data containing text data or graphic data.

Printing the print data output by the print data output unit 68 is controlled by the print control unit 70. The first printer 60 can therefore print a coupon related to a character or string in the receipt printed by the second printer 20, or the receipt that should be printed by the second printer 20.

The print data output unit 68 can also send the print data converted by the conversion unit 67 from the USB interface 64 to the second printer 20. For example, the print data output unit 68 can send to the second printer 20 the text data that the conversion unit 67 converted from the graphic data acquired by the print data acquisition unit 66 from the store server 101. The print data output unit 68 can also add the converted text data output from the conversion unit 67 to the print data received by the print data acquisition unit 66 from the POS terminal 10 to create new print data, and send the new print data with a print command to the second printer 20.

The first printer 60 has a mechanical assembly embodying the print unit 71, a main circuit board (print control board) not shown to which the print control unit 70 is disposed, and the data processing unit 61 as a discrete circuit board separate from the main circuit board. More specifically, the control unit 62, LAN interface 63, USB interface 64, storage unit 65, and communication unit 69 are mounted on a circuit board separate from the main board, and connect to the print control unit 70 through an inter-board interface.

When the POS terminal 10 sends a print command and print data for printing a receipt in the POS system 1 according to this embodiment, the print command and print data are received by the first printer 60. The first printer 60 sends the received print command and print data from the USB interface 64 to the second printer 20. As a result, the POS terminal 10 and second printer 20 operate as they do when connected directly to each other, and a receipt is printed by the second printer 20.

The first printer 60 in this POS system 1 can get data for printing a coupon from the store server 101 based on the print data sent from the POS terminal 10. Based on the acquired data for printing a coupon, the first printer 60 can control the print unit 71 with the print control unit 70 to print a coupon.

The first printer 60 in this POS system 1 can also acquire data for printing a coupon from the store server 101, and based on the acquired data direct the second printer 20 to print the coupon. This operation is further described with reference to FIG. 2.

Figure 2:
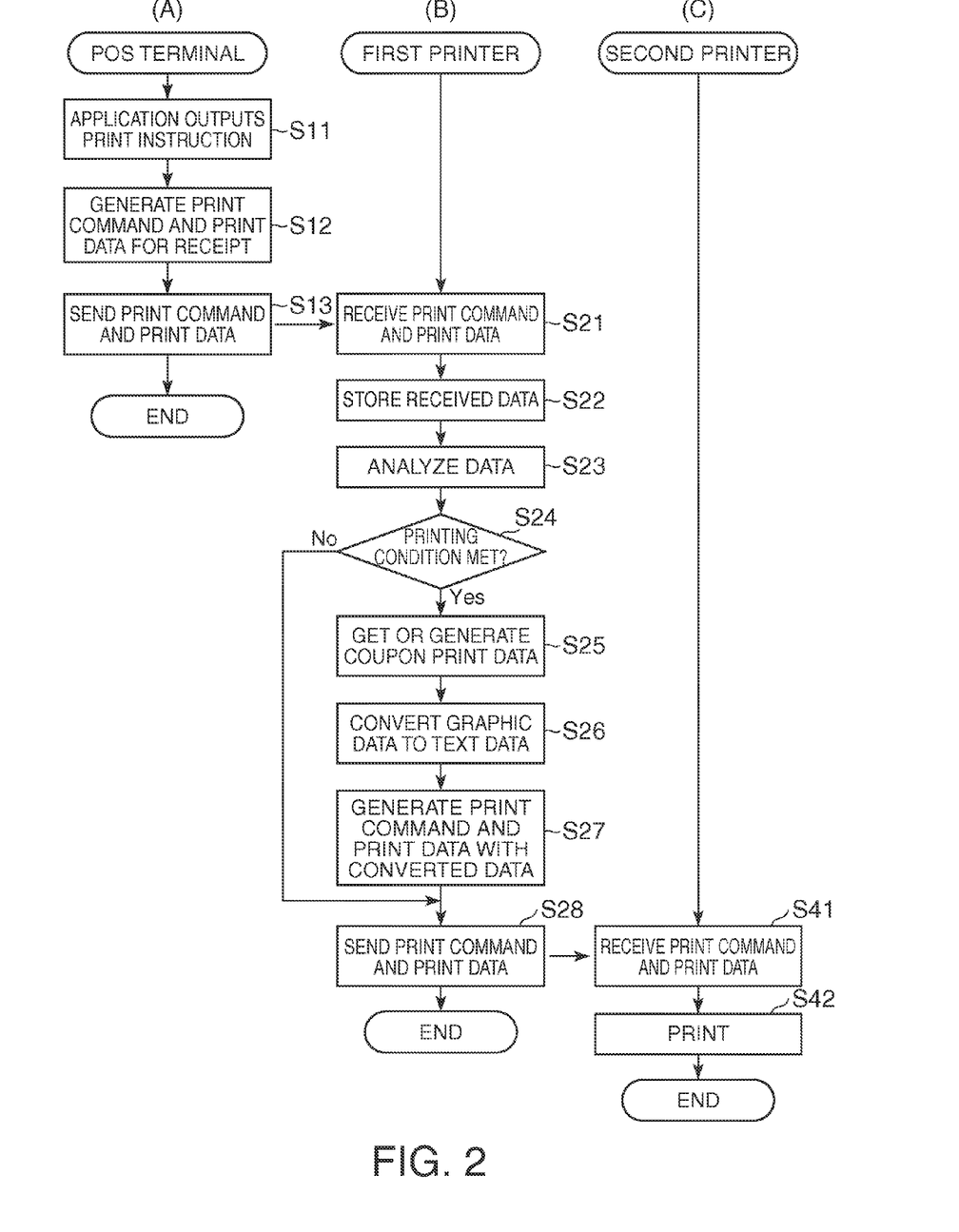
FIG. 2 is a sequence diagram showing an operation of parts of the POS system.

FIG. 2 is a sequence diagram showing the operation of parts of the POS system 1, column (A) showing the operation of the POS terminal 10, (B) showing the operation of the first printer 60, and (C) showing the operation of the second printer 20.

Figure 3:
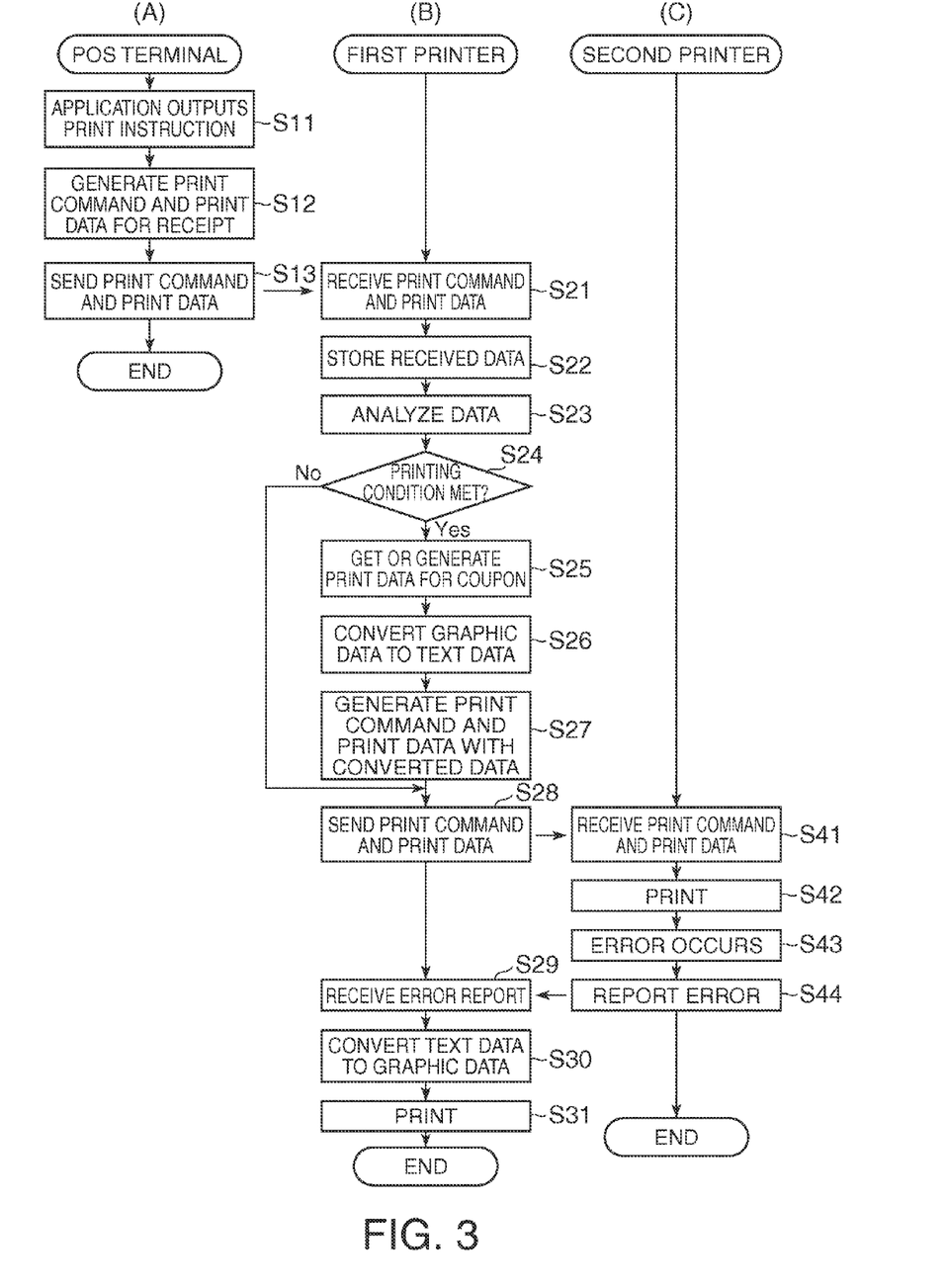
FIG. 3 is a sequence diagram showing another operation of parts of the POS system.

FIG. 2 and FIG. 3 described below describe operation when the second printer 20 is suited to printing text data. In this configuration, the POS terminal 10 sends print data containing text data as the print data output by the device driver execution unit 11B for printing by the second printer.

When the application execution unit 11A executes a transaction process by running a POS application program and outputs a print instruction for a receipt (step S11), the device driver execution unit 11B generates a print command and print data for the second printer 20 (step S12), and outputs from the USB interface 18 to the first printer 60 (step S13).

The print data acquisition unit 66 of the first printer 60 then receives the print command and print data sent from the POS terminal 10 through the communication unit 69 and USB interface 64 (step S21), and temporarily stores the received print data in the storage unit 65 (step S22). The print data acquisition unit 66 analyzes the stored print data (step S23) and determines if a predetermined condition is met (step S24). This condition is that the predetermined character or string is contained in the print data as described above. If the print data meets the condition (step S24 returns YES), the print data acquisition unit 66 gets coupon data from the store server 101, or retrieves data for printing a coupon (coupon print data) previously stored in the storage unit 12 (step S25).

If the coupon print data acquired by the print data acquisition unit 66 is graphic data, the conversion unit 67 converts the generated print data to text data and outputs the text data (step S26). The print data output unit 68 adds the converted data output from the conversion unit 67 to the print data stored in the storage unit 65 to generate a new print command and print data (step S27), and outputs to the second printer 20 (step S28).

If the print data does not meet the predetermined condition (step S24 returns NO), the first printer 60 does not perform steps S25 to S27.

The control unit 24 of the second printer 20 receives the print command and print data through the USB interface 22 (step S41), and prints (step S42). Because the second printer 20 prints the print command and print data sent by the first printer 60, a receipt and coupon are printed by the second printer 20 without changing the software of the second printer 20.

FIG. 3 is a sequence diagram showing the operation of parts of the POS system 1, column (A) showing the operation of the POS terminal 10, (B) showing the operation of the first printer 60, and (C) showing the operation of the second printer 20. FIG. 3 shows the operation whereby the first printer 60 prints a receipt instead of the second printer 20 when an error occurred in the second printer 20 during the operation shown in FIG. 2.

Steps S11 to S13 in (A) in FIG. 3, and steps S21 to S27 in (B) in FIG. 3, are the same as described in FIG. 2 above.

The control unit 24 of the second printer 20 receives a print command and print data through the USB interface 22 (step S41), and prints (step S42).

If an error occurs in the second printer 20 (step S43), the control unit 24 outputs an error report, which is a command reporting that an error occurred, from the USB interface 22 (step S44). Errors occurring in the second printer 20 include, for example, running out of paper, overheating, or a mechanical problem in the print unit 25, and software errors in the control unit 24.

The control unit 62 of the first printer 60 receives the error report sent by the second printer 20 through the USB interface 64 (step S29), and learns that an error occurred in the second printer 20. The control unit 62 then converts the print data with the conversion unit 67 (step S30) in order to print with the print control unit 70 and print unit 71 instead of the second printer 20. Because the data sent from the second printer 20 in step S28 is text data, the conversion unit 67 converts the print data sent in step S28 to graphic data in step S30. The resulting graphic data is data for printing a receipt and coupon. The print data output unit 68 outputs the graphic data converted by the conversion unit 67 to the print control unit 70, and the print control unit 70 controls the print unit 71 to print a receipt and coupon.

When the second printer 20 is suitable for printing graphic data, the device driver execution unit 11B transmits print data containing graphic data. In this event, the conversion unit 67 also executes the operation shown in FIG. 3. However, the conversion steps of step S26 and S30 in FIG. 3 (B) are not performed. As a result, print data containing graphic data is sent from the first printer 60 to the second printer 20 in step S28.

When the first printer 60 is configured for printing text data, the conversion unit 67 converts the graphic data sent in step S28 to text data in step S30, and the print data output unit 68 outputs the converted text data to the print control unit 70.

Operation when the first printer 60 is a thermal printer suited to printing text data, and the first printer 60 is used to print a coupon, is described next.

Figure 4:
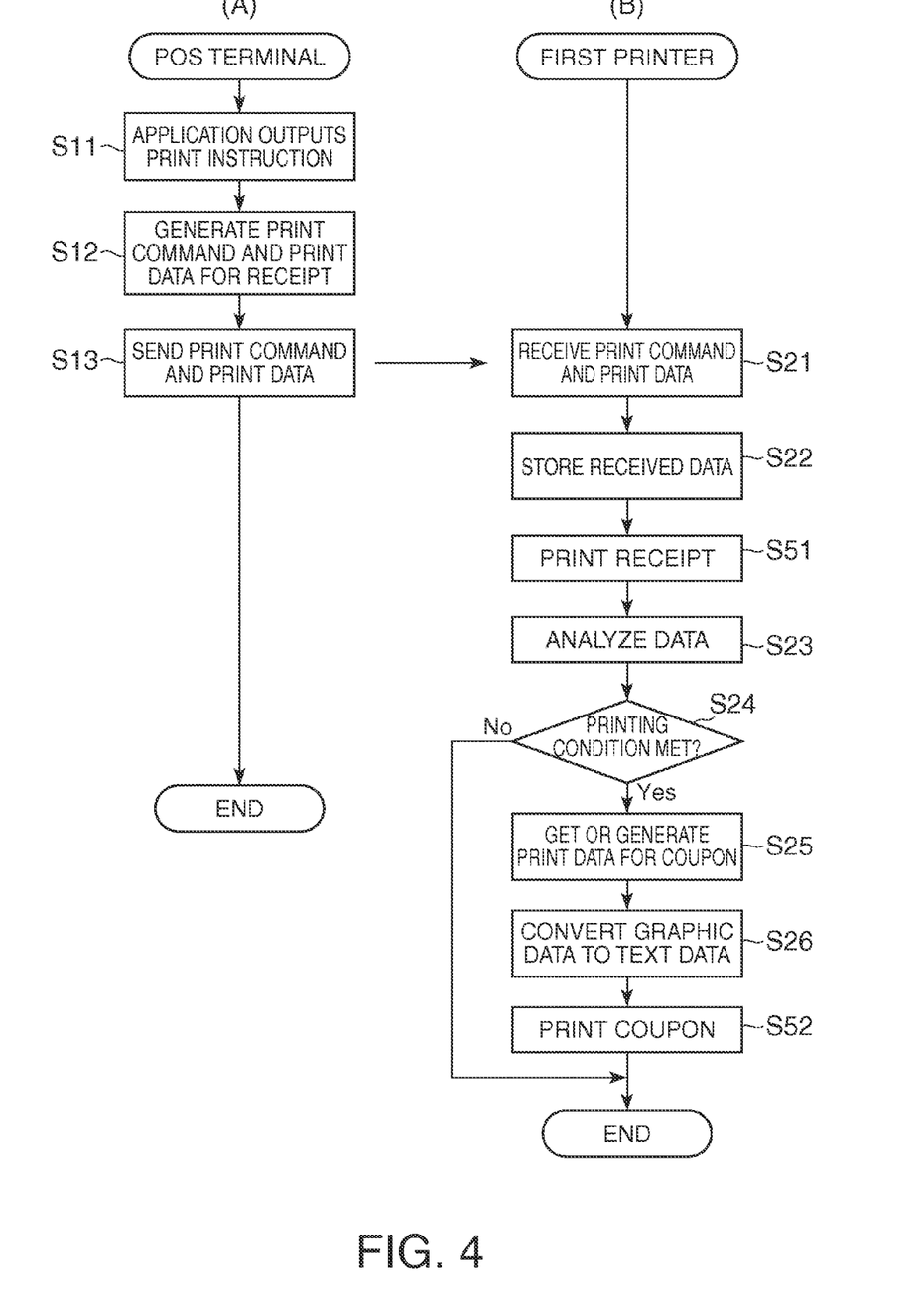
FIG. 4 is a sequence diagram showing another operation of parts of the POS system.

FIG. 4 is a sequence diagram showing another example of the operation of parts of the POS system 1, column (A) showing the operation of the POS terminal 10, and (B) showing the operation of the first printer 60.

Steps S11 to S13 in FIG. 4 (A) are the same as described above.

The print data acquisition unit 66 of the first printer 60 then receives the print command and print data sent from the POS terminal 10 through the communication unit 69 and USB interface 64 (step S21), and temporarily stores the received print data in the storage unit 65 (step S22).

The control unit 62 then outputs the print data received by the print data acquisition unit 66 to the print control unit 70, and the print control unit 70 prints a receipt with the print unit 71 (step S51).

The print data acquisition unit 66 then analyzes the stored print data (step S23) and determines if a predetermined condition is met (step S24). If the print data meets the condition (step S24 returns YES), the print data acquisition unit 66 gets coupon data from the store server 101, or retrieves coupon print data previously stored in the storage unit 12 (step S25).

If the coupon print data acquired by the print data acquisition unit 66 is graphic data, the conversion unit 67 converts the generated print data to text data and outputs the text data (step S26). The print data output unit 68 outputs the converted data from the conversion unit 67 to the print control unit 70, and the print control unit 70 controls the print unit 71 to print a coupon (step S52).

If the print data does not meet the predetermined condition (step S24 returns NO), the first printer 60 does not perform Steps S25 to S27.

The POS system 1 according to the first embodiment thus includes a first printer 60 with a print unit 71 connected to a POS terminal 10 and as described above. The first printer 60 acquires the data output by the POS terminal 10 through the print data acquisition unit 66. The conversion unit 67 of the first printer 60 processes converting graphic data to text data, or converting text data to graphic data, depending on the data acquired by the print data acquisition unit 66. The print data output unit 68 then outputs the converted data produced by the conversion unit 67. Because the first printer 60 converts the data output by the POS terminal 10, the first printer 60 can be selected and connected without being limited by the type of data output by the POS terminal 10.

The POS terminal 10 of the POS system 1 outputs print data containing text data. The first printer 60 acquires the print data output by the POS terminal 10 through the print data acquisition unit 66. The conversion unit 67 then runs a process of converting the text data contained in the print data acquired by the print data acquisition unit 66 to graphic data. As a result, a POS system 1 can be configured by connecting a first printer 60 that is suited to printing graphic data to a POS terminal 10 that outputs text data.

The first printer 60 can also drive the print unit 71 to print based on the data output by the print data output unit 68. As a result, the first printer 60 can be connected and printed regardless of the type of data output by the POS terminal 10.

The POS system 1 also has a second printer 20 connected to the first printer 60. The first printer 60 outputs the converted data generated by the print data output unit 68 to the second printer 20. The second printer 20 then prints the converted data output by the print data output unit 68. In this embodiment the first printer 60 converts and outputs the data output by the POS terminal 10 to the second printer 20, causing the second printer 20 to print. As a result, two printers can be connected without being limited by the type of data output by the POS terminal 10. The POS system 1 can therefore be built by connecting the first printer 60 to a system having the POS terminal 10 connected to the second printer 20.

The POS terminal 10 outputs print data for printing by the second printer 20, and the print data acquisition unit 66 of the first printer 60 acquires the print data output from the POS terminal 10. As a result, the second printer 20 can print the print data output by the POS terminal 10, and the first printer 60 can process the print data output by the POS terminal 10. For example, when the first printer 60 and the second printer 20 are designed to print different types of data, the print data output by the POS terminal 10 can be appropriately processed by the first printer 60 and second printer 20.

The POS system 1 can also be built by adding a first printer 60 to a system composed of the POS terminal 10 and second printer 20, for example. In this embodiment, the first printer 60 is a printer appropriate to the type of data output by the POS terminal 10. The first printer 60 can therefore be easily added to a system that includes the second printer 20.

The POS terminal 10 outputs print data containing transaction information as text data, and the first printer 60 prints a receipt based on the print data containing the text data for the transaction. As a result, a first printer 60 suited to printing graphic data can output a receipt. The first printer 60 can also acquire print data output from the POS terminal 10, and execute a process with the conversion unit 67 to convert graphic data contained in the print data acquired by the print data acquisition unit 66 to text data. As a result, a first printer 60 suited to printing text data can be connected to a POS terminal 10 that outputs graphic data to construct a POS system 1.

The print unit 71 of the first printer 60 prints based on data output by the print data output unit 68. As a result, the first printer 60 can be selected without being limited by the type of data output by the POS terminal 10.

Based on data output by the POS terminal 10, the print data acquisition unit 66 of the first printer 60 acquires graphic data for a coupon from the store server 101, which is an external device. The conversion unit 67 then runs a process that converts the graphic data acquired by the print data acquisition unit 66 from an external source to text data, and the print unit 71 prints based on the text data output by the print data output unit 68 after conversion.

As a result, the first printer 60 acquires graphic data from an external source, and converts the graphic data to text data to print. The first printer 60 can also acquire and print other data, including data related to the data output by the POS terminal 10. The first printer 60 can also print whether the externally acquired data is graphic data or text data. As a result, the first printer 60 is not limited to a particular type of data, and can externally acquire and print various kinds of data.

A first printer 60 can also be installed and used in a POS system 1 without affecting the function of the application execution unit 11A of the POS terminal 10 and the second printer 20. For example, an existing second printer 20 can be replaced with the first printer 60, or a new first printer 60 can be installed to extend the functionality of the POS system 1. The first printer 60 can also print a coupon related to a receipt without affecting the corresponding receipt that is printed by the second printer 20. Yet further, because the first printer 60 can substitute for the function of the second printer 20 and print receipts, the first printer 60 can also be used to replace the second printer 20.

The conversion unit 67 can also convert text data formatted for the size of a particular print medium to graphic data formatted for the size of the print medium used by the print unit 71, and print appropriately to the print medium that is used.

When the POS system 1 is configured by adding a first printer 60 to a system including a POS terminal 10 and connected second printer 20, there is no need to change the configuration of the POS terminal 10 or reconfigure settings related to the operation of the application execution unit 11A or device driver execution unit 11B, and there is no need to change the operation of the control unit 24 of the second printer 20.

Embodiment 2

Figure 5:
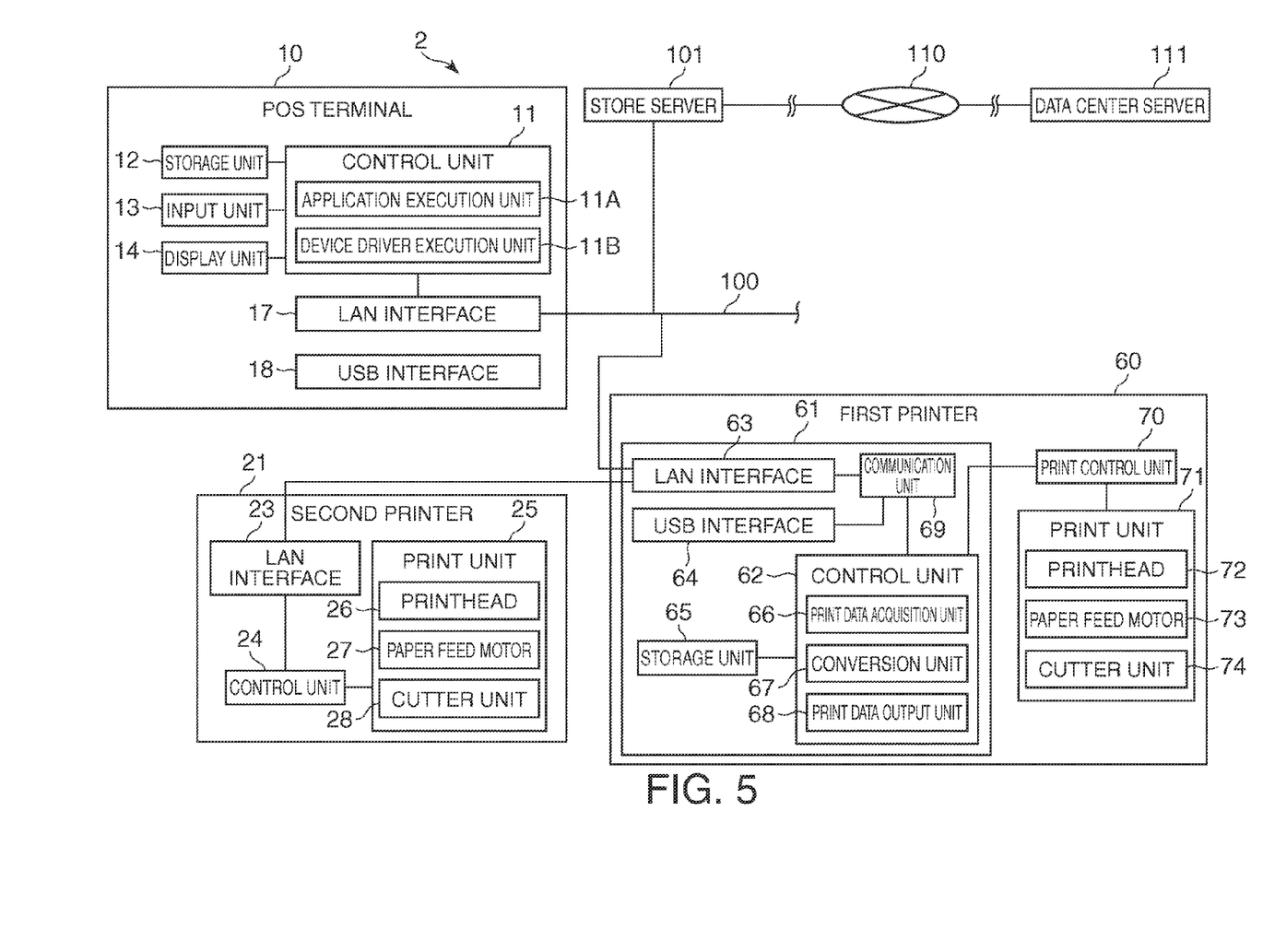
FIG. 5 is a functional block diagram of a POS system according to a second embodiment.

FIG. 5 is a functional block diagram of a POS system 2 according to a second embodiment.

This second embodiment describes a POS system 2 (printing system). The POS system 2 includes a second printer 21 (second printing device) that prints receipts connected through an in-store LAN 100 to a POS terminal 10. While the second printer 20 and the POS terminal 10 are connected locally in the POS system 1 according to the first embodiment described above, the second printer 21 is connected to the POS terminal 10 through a network in this POS system 2.

Note that like parts in this second embodiment and the first embodiment described above are identified by like reference numerals, and further description thereof is omitted.

In the POS system 2 according to the second embodiment, the POS terminal 10 is connected to the first printer 60 through the in-store LAN 100.

The second printer 21 includes a control unit 24 and print unit 25 similarly to the second printer 20 in the first embodiment, but has a LAN interface 23 instead of the USB interface 22. The LAN interface 23 has an Ethernet (R) connector, for example, and sends and receives data with other devices through a LAN cable. In this second embodiment the second printer 21 connects to the first printer 60 through a LAN cable, and connects to the in-store LAN 100 by means of a hub function of the LAN interface 63. Other than communicating through a LAN cable with the first printer 60 and POS terminal 10, the second printer 21 operates in the same way as the second printer 20 (FIG. 1). The LAN interface 63 functions in this embodiment as a connection unit.

The POS terminal 10 sends print commands and print data from the LAN interface 17 through the in-store LAN 100 to the second printer 21. The print command and print data sent by the POS terminal 10 are sent to the second printer 21 passing through the LAN interface 63. Commands and data sent by the second printer 21 are sent through the LAN interface 63 to the in-store LAN 100, and received by the POS terminal 10 or other device.

The control unit 62 controls the LAN interface 63, and receives and stores the data sent from the POS terminal 10 to the second printer 21 in the storage unit 65. The control unit 62 also receives the commands and data sent by the second printer 21 to the POS terminal 10 through the LAN interface 63, and sends these commands and data from the LAN interface 63 to the in-store LAN 100 only when transmission to the POS terminal 10 is required. The control unit 62 thus relays and controls data communication between the POS terminal 10 and second printer 21 by means of the LAN interface 63.

The POS system 2 according to the second embodiment operates identically to the operation described above with reference to FIG. 2 to FIG. 4. More specifically, when the POS terminal 10 sends a print command and print data for printing a receipt to the second printer 21, the first printer 60 receives the print command and print data through the LAN interface 63, and relays the print command and print data from the LAN interface 63 to the second printer 21.

Based on the print data received from the POS terminal 10, the control unit 62 acquires coupon print data from the store server 101, converts the acquired coupon print data to text data, adds the text data to the print data for a receipt sent from the POS terminal 10, and outputs to the second printer 21. The second printer 21 then prints a receipt and coupon.

When the first printer 60 is designed for printing text data, the print data acquisition unit 66 converts the graphic data acquired from the store server 101 to text data, and prints a coupon using the first printer 60.

This embodiment can therefore be used to achieve the same effect as the first embodiment described above when the second printer 21 is connected to the POS terminal 10 through a LAN cable. The first printer 60 can also be used in the POS system 2 shown in FIG. 5 to handle limitations resulting from the type of data that is processed. For example, when the first printer 60 is intended for printing text data and the second printer 21 is intended for printing graphic data, and an error occurs in the second printer 21 during printing, for example, the first printer 60 can reconvert the graphic data sent to the second printer 21 to text data, and the print control unit 70 can control the print unit 71 to print based on the resulting text data. As a result, the first printer 60 can substitute for the second printer 21 and print a receipt and coupon.

The first printer 60 can also be used in the POS system 2 shown in FIG. 5 without limitations resulting from differences in the type of data processed.

When the first printer 60 is intended for printing graphic data and an error occurs in the second printer 21 while printing, the first printer 60 reconverts the text data sent to the second printer 21 to graphic data, and controls the print unit 71 by means of the print control unit 70 to print based on the converted graphic data. As a result, the first printer 60 can substitute for the second printer 21 and print a receipt and coupon.

When the first printer 60 is designed for printing text data, the print data acquisition unit 66 can convert graphic data acquired from the store server 101 to text data, and the print unit 71 of the first printer 60 can print a coupon.

This embodiment can therefore be used to achieve the same effect as the first embodiment described above when the second printer 21 is connected to the POS terminal 10 through a LAN cable.

Embodiment 3

Figure 6:
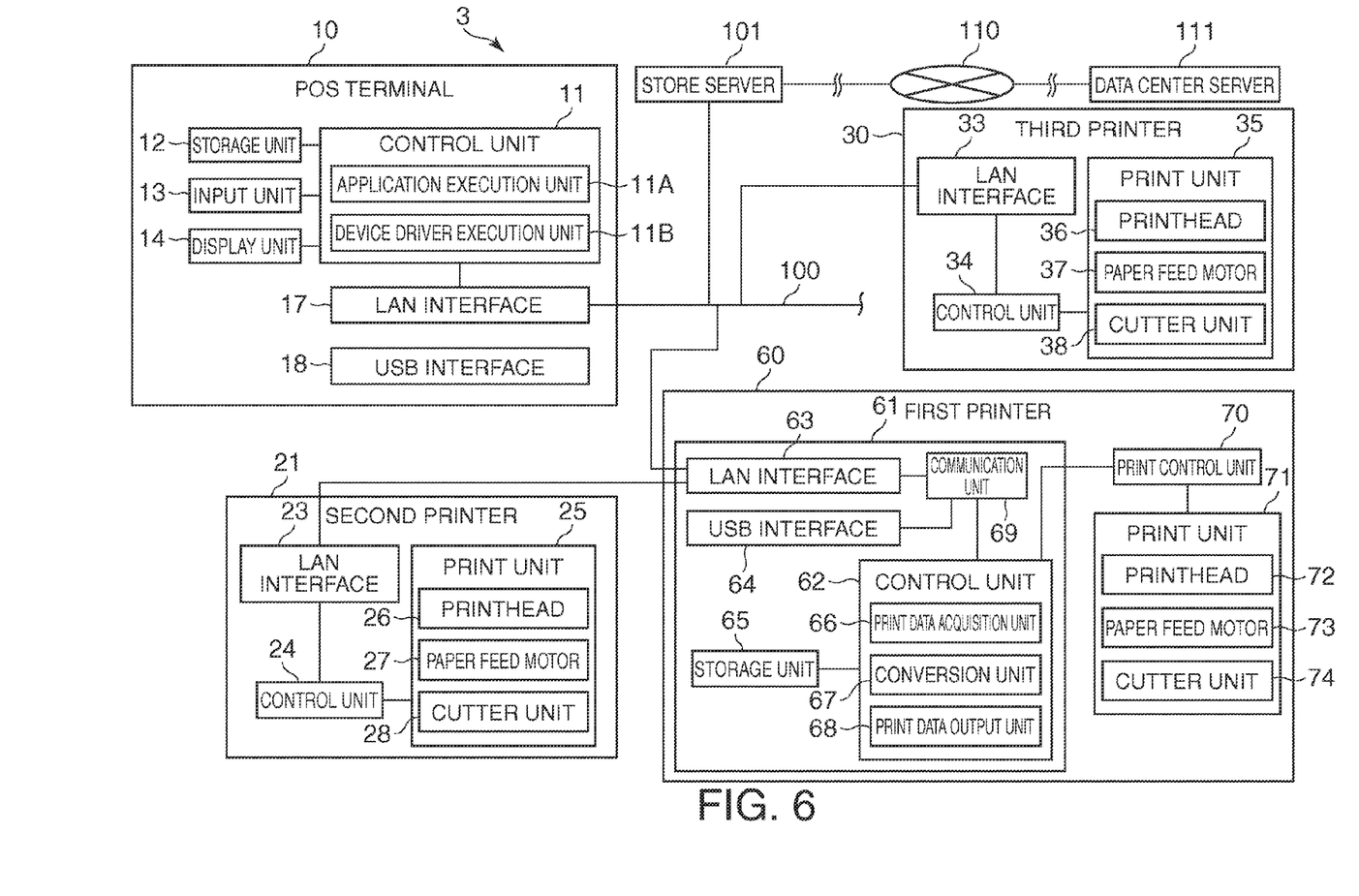
FIG. 6 is a functional block diagram of a POS system according to a third embodiment.

FIG. 6 is a functional block diagram of a POS system 3 according to a third embodiment.

The POS system 3 (printing system) according to the third embodiment adds a dedicated third printer 30 (third printing device) for printing coupons to the POS system 2 according to the second embodiment. Like parts in this third embodiment and the first and second embodiments described above are identified by like reference numerals, and further description thereof is omitted.

The third printer 30 has a LAN interface 33 that connects to the in-store LAN 100, and a control unit 34 that receives print data sent by the POS terminal 10 through the LAN interface 33. The control unit 34 detects a predetermined character or string in the received print data, and acquires coupon data related to the detected character or string from the store server 101. The control unit 34 then prints the coupon print data acquired from the store server 101 with the print unit 35.

The print unit 35 includes a print head 36 that prints characters and images on roll paper, cut-sheet paper, or other print medium as controlled by the control unit 34, a paper feed motor 37 that conveys the print medium as controlled by the control unit 34, and a cutter unit 38 that cuts the print medium as controlled by the control unit 34.

The third printer 30 in this embodiment is an inkjet printer, is designed for printing graphic data, and is suitable for printing graphic data for a coupon acquired from the store server 101.

The POS terminal 10, second printer 21, and first printer 60 in this POS system 3 can perform the same operations as in the first and second embodiments.

In addition, when an error occurs in the third printer 30 while printing a coupon, the first printer 60 can replace the third printer 30 and print the coupon. If the first printer 60 is a thermal printer suited for printing text data, the first printer 60 converts graphic data for the coupon to text data and prints the coupon. This operation is described next with reference to FIG. 7.

Figure 7:
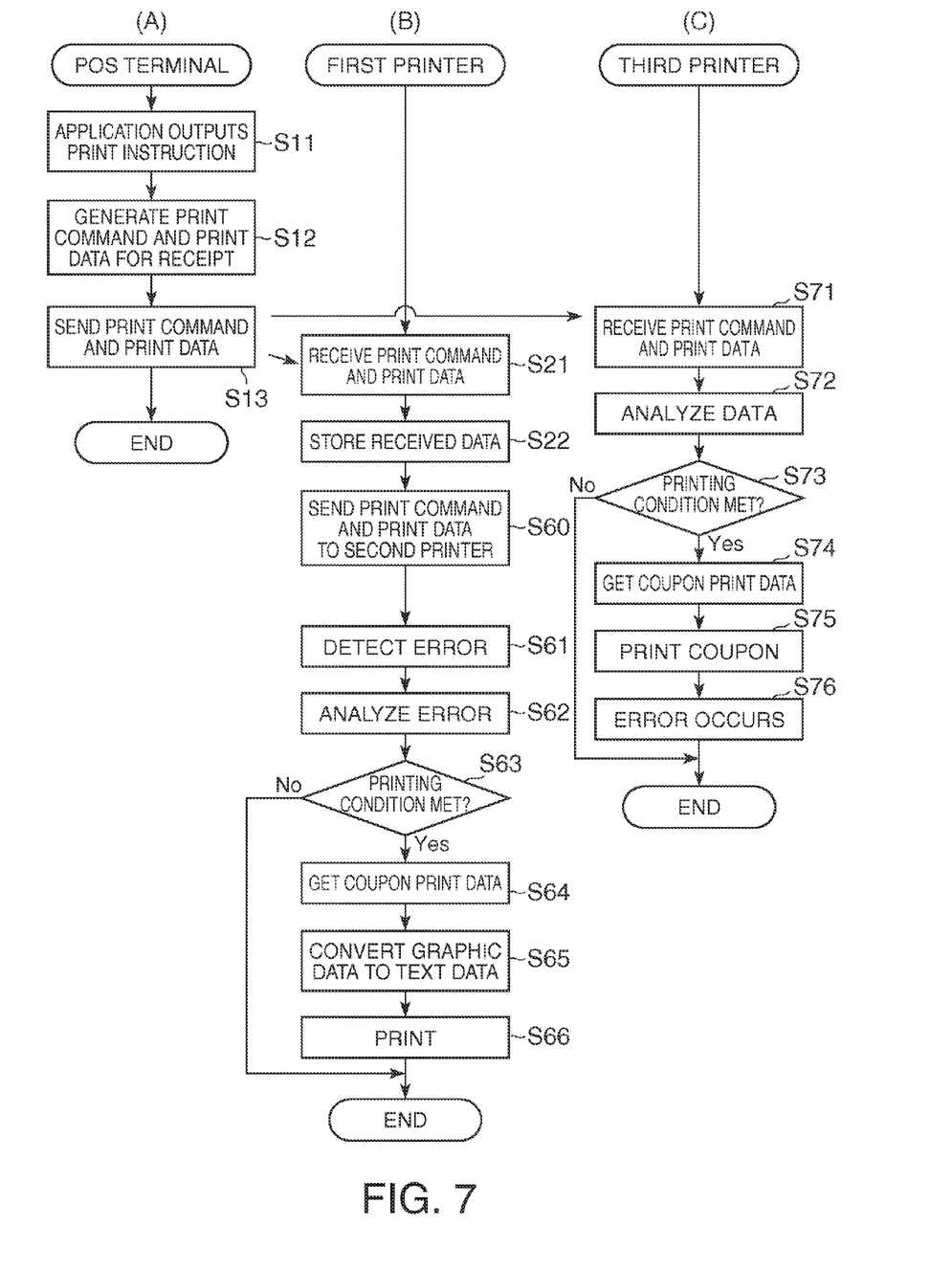
FIG. 7 is a sequence diagram showing an operation of parts of the POS system.

FIG. 7 is a sequence diagram showing the operation of parts of the POS system 3, column (A) showing the operation of the POS terminal 10, (B) showing the operation of the first printer 60, and (C) showing the operation of the third printer 30.

The operation of the POS terminal 10 shown in steps S11 to S13 in FIG. 7 (A) is the same as shown in FIG. 2 (A) except for the communication of print commands and print data through the in-store LAN 100. The operation of the first printer 60 shown in steps S21 to S22 in FIG. 7 (B) is the same as shown in FIG. 2 (B) except for the communication of print commands and print data through the LAN interface 63. More specifically, the first printer 60 in this embodiment receives print commands and print data sent from the POS terminal 10 by means of the print data acquisition unit 66 (step S21), stores the received print commands and print data in storage unit 65 (step S22), and sends the print commands and print data to the second printer 21 (step S60).

The control unit 34 of the third printer 30 receives the print commands and print data sent from the POS terminal 10 through the LAN interface 33 (step S71), analyzes the received print data (step S72), and determines if a predetermined condition is met (step S73). If the print data meets the condition (step S73 returns YES), the control unit 34 acquires coupon data from the store server 101 and generates data for printing the coupon (step S74). The control unit 34 then controls the print unit 35 to print the coupon (step S75). If the print data does not meet the condition (step S73 returns NO), the control unit 34 ends the operation.

If an error occurred in the print unit 35 (step S76), the control unit 62 of the first printer 60 detects the error in the third printer 30 (step S61), when the third printer 30 reports the occurrence of the error (similar to step S44 above) via the in-store LAN 100. The print data acquisition unit 66 analyzes the stored print data (step S62), and determines if a predetermined condition is met (step S63). If the print data met the condition (step S63 returns YES), the print data acquisition unit 66 acquires coupon data from the store server 101, or gets data for printing a coupon previously stored in the storage unit 12 (step S64).

Because the coupon print data generated by the print data acquisition unit 66 is graphic data, the conversion unit 67 converts the generated print data to text data and outputs the text data (step S65). The print data output unit 68 outputs the converted data from the conversion unit 67 to the print control unit 70, and the print control unit 70 controls the print unit 71 to print a coupon (step S66). If the print data does not meet the condition (step S63 returns NO), the first printer 60 stops operation.

If an error occurs in the third printer 30 that prints coupons based on print data sent by the POS terminal 10 to the second printer 21, the first printer 60 can print the coupon instead of the third printer 30. Because the first printer 60 can also be used in this third embodiment to handle limitations due to the type of data processed, the first printer 60 can convert graphic data for printing a coupon to text data and print the text data. The first printer 60 can also substitute for either or both the second printer 21 and third printer 30 in the POS system 3 without affecting the configuration of the POS terminal 10. For example, the first printer 60 can be used as a replacement for either or both the second printer 21 and third printer 30.

An embodiment of the disclosure is described above, but the disclosure is not limited thereto and can obviously be modified and adapted as desired within the scope of the disclosure.

For example, the foregoing embodiments describe using the first printer 60 in a POS system having a POS terminal 10 that runs a POS application program as a host with a second printer 20, 21 and/or third printer 30 connected to the POS terminal 10, but the disclosure is not so limited. For example, the disclosure can also be applied to configurations having a printer connected to a host that performs a different processing operation and prints out other types of forms.

The foregoing embodiments also describe sending print commands and print data to printers from a POS terminal 10 operating as a host device, but a mobile terminal can be used instead of the POS terminal 10, or a client could connect through a communication line to a remotely located server. In this embodiment, the remote server runs an application program, and the client sends print commands and print data generated and transmitted by the server to the printers.

The printers are also not limited to connecting to the POS terminal 10 by wire, and could connect to the POS terminal 10 wirelessly.

The process of converting graphic data to text data in the first, second, and third embodiments described above is also not limited to coupon print data acquired from the store server 101.

More specifically, graphic data can be included with the text data for transaction information in the print data for a receipt output by the POS terminal 10 in step S12 in each of the foregoing embodiments. This graphic data may be a logo for the store where the receipt is printed, for example. When the first printer 60 is designed for printing text data in this embodiment, the conversion unit 67 converts the graphic data for the store logo to text data. The conversion unit 67 also does not convert the text data contained in the print data for the receipt output by the POS terminal 10. The print data output unit 68 outputs the text data for a transaction contained in the receipt print data, and the text data acquired by converting the store logo or other graphic data to text data. This text data is output to the print control unit 70 and printed by the print unit 71.

When the second printer 20 is intended for printing text data, the print data output unit 68 can also output the converted text data to the second printer 20. In this event, the text data for the transaction information contained in the receipt print data, and the text data converted from the store logo or other graphic data, are printed by the second printer 20. This configuration can also be applied to the first embodiment described above. More specifically, when the first printer 60 prints a receipt in step S51 in the first embodiment, the graphic data contained in the receipt print data can be converted to text data.

The disclosure can also be used when the first printer 60 is designed for printing text data in the second embodiment and the first printer 60 substitutes for the second printer 20 and prints a receipt.

The disclosure can also be used when the first printer 60 prints receipts in the third embodiment.

The POS terminal 10, second printer 20, and first printer 60 in the foregoing embodiments are described as having a USB interface or being connectable to a in-store LAN 100 through an Ethernet connection, but the disclosure is not so limited and the disclosure can be used using any interface enabling data communication between plural devices.

The print unit 25 of the second printer 20, 21, the print unit 35 of the third printer 30, and the print unit 71 of the first printer 60 in the foregoing embodiments are described as printing to cut-sheet paper or roll paper, but the print unit of the disclosure is not so limited, and a thermal printer, inkjet printer, dot impact printer, laser printer, or other type of printer may be used. Of the function blocks shown in the FIG. 1, FIG. 5, and FIG. 6, parts including at least the control units can be achieved through the cooperation of hardware and software, and do not suggest a specific hardware configuration. A configuration that executes the operations including the operations shown in the accompanying sequence diagrams can also be embodied by these parts executing a program stored on an externally connectable non-transitory storage medium.

The disclosure being thus described, will present numerous variation possibilities to those skilled in the art based on such disclosure. Such variations are not to be regarded as a departure from the spirit and scope of the disclosure. Rather, all such variations are intended to be part of the disclosure to the extent embodied in within the scope of any of the following claims.

What is claimed is:

1. A printing system including a host device and a printing device having a print unit, the printing device comprising:
    a data acquisition unit that acquires print data output by the host device, the acquired print data containing at least one of text data and graphic data;
    a conversion unit that applies to the print data acquired by the data acquisition unit at least one of a process that converts graphic data contained in the print data to text data and a process that converts text data contained in the print data to graphic data to generate converted print data; and
    an output unit that outputs the converted print data produced by the conversion unit; and
a second printing device connected to the printing device;
wherein the conversion unit applies a resizing process to the print data acquired by the data acquisition unit to make the print data compatible with a size of a print medium to be used by the printing device;
wherein the output unit of the printing device outputs the converted print data to the second printing device,
wherein the second printing device prints the converted print data output by the output unit.

2. The printing system described in claim 1, wherein:
the host device outputs print data containing text data;
the data acquisition unit of the printing device acquires the print data containing text data output by the host device; and
the conversion unit executes the process of converting the text data contained in the print data acquired by the data acquisition unit to graphic data.

3. The printing system described in claim 2, wherein:
the print unit of the printing device prints based on the converted print data output by the output unit.

4. The printing system described in claim 3, wherein:
the host device is a POS terminal that outputs the print data containing text data for transaction information; and
the printing device prints a receipt based on the print data containing text data for transaction information output by the output unit.

5. The printing system described in claim 1, wherein:
the print data output by the host device contains text data and graphic data;
the data acquisition unit of the printing device acquires the print data containing text and graphic data output by the host device;
the conversion unit executes the process of converting the graphic data contained in the print data acquired by the data acquisition unit to text data and the process of converting the text data contained in the print data acquired by the data acquisition unit to graphic data to generate the converted print data; and
the output unit outputs the converted print data produced by the conversion unit.

6. The printing system described in claim 5, wherein:
the print unit of the printing device prints based on the converted print data output by the output unit.

7. The printing system described in claim 5, wherein:
the host device comprises a POS terminal that outputs the print data containing graphic data and text data for transaction information; and
the print unit prints a receipt based on the converted data output by the output unit.

8. The printing system described in claim 5, wherein:
the data acquisition unit of the printing device acquires graphic data from an external source based on the print data output by the host device;

the conversion unit executes a process of converting the graphic data acquired by the data acquisition unit from an external source to text data; and the print unit prints based on the converted text data output by the output unit.

9. The printing system described in claim 8, wherein:

the host device is a POS terminal that outputs the print data containing text data for transaction information; and the data acquisition unit of the printing device acquires graphic data from an external source based on the text data for transaction information contained in the print data output by the host device.

\* \* \* \* \*